US012363314B1

(12) United States Patent
Guo et al.

(10) Patent No.: US 12,363,314 B1
(45) Date of Patent: Jul. 15, 2025

(54) CONSTRUCTING MOTION VECTOR CANDIDATES LIST FOR VIDEO CODING

(71) Applicant: Zoom Video Communications, Inc., San Jose, CA (US)

(72) Inventors: Yi Guo, Zhejiang (CN); Zhichu He, Zhejiang (CN); Rui Li, Zhejiang (CN); Bo Ling, Saratoga, CA (US); Jing Wu, Zhejiang (CN); Minxia Yang, Zhejiang (CN); Yichen Zhang, Zhejiang (CN)

(73) Assignee: Zoom Communications, Inc., San Jose, CA (US)

( * ) Notice: Subject to any disclaimer, the term of this patent is extended or adjusted under 35 U.S.C. 154(b) by 85 days.

(21) Appl. No.: 18/383,678

(22) Filed: Oct. 25, 2023

Related U.S. Application Data

(60) Provisional application No. 63/528,200, filed on Jul. 21, 2023.

(51) Int. Cl.
*H04N 19/159* (2014.01)
*H04N 19/139* (2014.01)
*H04N 19/176* (2014.01)

(52) U.S. Cl.
CPC ......... *H04N 19/159* (2014.11); *H04N 19/139* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2020/0107017 A1* | 4/2020 | Hung | H04N 19/132 |
| 2021/0281855 A1* | 9/2021 | Skupin | H04N 19/109 |
| 2022/0167001 A1* | 5/2022 | Zhang | H04N 19/176 |
| 2022/0210438 A1* | 6/2022 | Chen | H04N 19/172 |
| 2022/0224911 A1* | 7/2022 | Park | H04N 19/44 |
| 2022/0279161 A1* | 9/2022 | Lim | H04N 19/1883 |
| 2022/0353500 A1* | 11/2022 | Li | H04N 19/1887 |

(Continued)

OTHER PUBLICATIONS

Browne et al., "Algorithm Description for Versatile Video Coding and Test Model 20 (VTM20)," JVET-AD2002-v1, 30th Meeting: Antalya, TR, Apr. 21-28, 2023.*

(Continued)

*Primary Examiner* — Michael J Hess
(74) *Attorney, Agent, or Firm* — Kilpatrick Townsend & Stockton LLP

(57) ABSTRACT

Constructing a motion vector candidate list for inter-prediction in video coding is provided. A video encoder performs inter prediction for a frame of the video to generate prediction residuals. The inter prediction is performed using motion vectors (MVs) for blocks of the frame. To determine the motion vector of a block, the encoder determines an integer-valued MV for the block based on a reference frame and selects, based on the integer-valued MV, a subset of candidate MVs from a list of MVs including MVs of neighboring blocks. The encoder identifies a MV from the subset of candidate MVs for the block and searches in a neighborhood of the identified MV for a refined MV. The encoder calculates the prediction residuals for the block based on a reference block in the reference frame pointed by the refined MV and encodes the prediction residuals into a bitstream representing the video.

20 Claims, 7 Drawing Sheets

(56) References Cited

U.S. PATENT DOCUMENTS

2023/0109532 A1* 4/2023 Chen .................. H04N 19/46
　　　　　　　　　　　　　　　　　　　375/240.02
2025/0080719 A1* 3/2025 Zhang ................ H04N 19/159

OTHER PUBLICATIONS

"Dav1d", Retrieved from the internet on Oct. 23, 2023 from: https://code.videolan.org/videolan/dav1d, 4 pages.

"Alliance for Open Media", Retrieved from internet on Oct. 25, 2023 from: https://aomedia.googlesource.com/aom, 14 pages.

* cited by examiner

CONSTRUCTING MOTION VECTOR CANDIDATES LIST FOR VIDEO CODING

CROSS REFERENCE TO RELATED APPLICATIONS

This application claims priority to U.S. Provisional Application No. 63/528,200 filed Jul. 21, 2023, and entitled "Constructing Motion Vector Candidate List for Video Coding," the entire contents of which are incorporated herein by reference.

FIELD

The present application relates to digital video coding. More specifically, the present application relates to video encoding to improve coding efficiency by constructing a motion vector candidate list for inter-prediction in video coding to improve the video coding speed and efficiency.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION OF THE DRAWINGS

Figure 1:
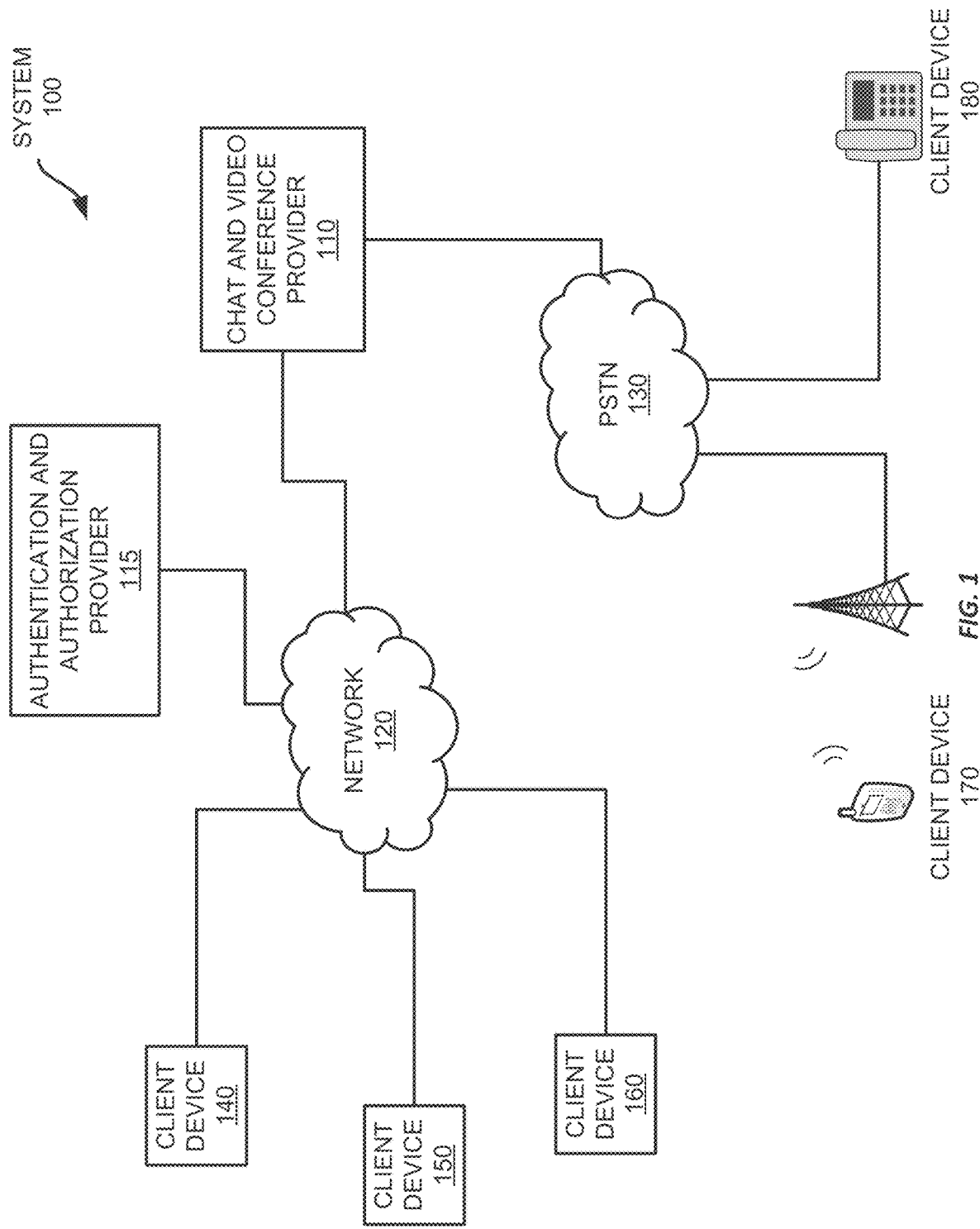
FIG. 1 shows an example of a system for providing videoconferencing and chat functionality to various client devices according to some aspects of the present disclosure.

Examples are described herein in the context of systems and methods for constructing a motion vector candidate list for inter-prediction in video coding. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Online conferencing systems enable their users to create and attend conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

During a videoconference, the video streams may undergo some level of compression for various reasons, such as to reduce network bandwidth usage, latency, or lag. This compression is normally performed by a video encoder on the client device that is providing the video stream. After compressing the video stream, the client device transmits the compressed video stream to the other client devices associated with the other participants in the videoconference. Those client devices can then decompress the compressed video stream using their respective video decoders.

Although there are many different kinds of compression techniques, a typical compression process will normally involve an initial blocking operation in which a video frame is divided into superblocks each of which is further divided into rectangular blocks of pixels, which are referred to herein as coding blocks. A coding block can have 128×128 pixels, 64×64 pixels, 32×32 pixels, 8×8 pixels, 4×4 pixels, or other sizes. Each coding block may be predicted using blocks that have been previously encoded, via intra- or inter-prediction. The difference between the predicted values and the original values of a coding block, also referred to as residuals, can be calculated. A transform operation can be performed in which a transform function (e.g., a discrete cosine transform or a discrete wavelet transform) is applied to the residuals in each block, to transform the residuals into frequency-domain coefficients. For example, if a coding block has 8×8 pixels, the transform function would operate on 64 input residual values and yield 64 frequency-domain coefficients. These frequency-domain coefficients can be referred to as frequency residuals, since they represent residuals in the frequency domain, as described in greater detail later on. After the transform operation, a quantization operation can be performed to quantize the frequency residuals. During the quantization operation, each frequency residual is compared to a predefined quantization threshold. Frequency residuals that fall below the quantization threshold are set to zero. Thus, following quantization, more of the frequency residuals may have values of zero than prior to quantization. After the quantization operation, entropy coding may be performed to reduce the number of bits used to represent the quantized frequency residuals. Examples of entropy coding can include run-length encoding, variable-length encoding, and arithmetic coding.

In inter-prediction, the prediction of a block in a picture is from one or more previously encoded video pictures, referred to as reference pictures. A video encoder can compare the current block of the current picture with decoded reference pictures for motion estimation. A reference block from the decoded reference pictures that best matches the current block can be selected. An offset between the position (e.g., x, y coordinates) of the reference block and the position of the current block can be identified. This offset is referred to as the motion vector (MV) and the reference block is the predicted block of the current block.

To determine the MV for the current block, a motion vector predictor (MVP) list is typically used. The MVP list may contain the MVs of N neighboring blocks and/or combinations of one or more of these MVs (e.g., weighted or unweighted average or other linear or nonlinear combinations) as the candidate MVs for the current block. The neighboring blocks include neighboring blocks above the current block, to the left of the current block, at the top left corner of the current block, and so on. In some examples, N is set to be four. Each of the N candidate MVs is used to generate a predicted block and the candidate MV that leads to the smallest distortion between the predicted block and the current block is selected for further MV search. However, not all of these candidate MVs are accurate estimates of the MV of the current block. As such, calculating N predicted blocks using all N candidate MVs can be inefficient and cause waste of computing resources and reduced encoding speed.

To improve the speed of the video encoding and the coding efficiency, a subset of candidate MVs can be selected from the MVP list without generating the predicted block for each candidate MV. In some examples, the video encoder can determine a predicted block of the current block in the reference picture using integer-valued MV. In other words, the encoder can search for a block in the reference picture that best matches the current block by constraining the MV to be integer values. The determined integer MV is then compared with the candidate MVs in the MVP list. The n candidate MVs (n<N, e.g., n=2) that have the smallest n distances to the integer MV can be selected and added to the MV candidate list for the current block. Each of the n candidate MVs in the candidate list is used to generate a reference block which is compared with the current block to determine a corresponding distortion. The candidate MV leading to the smallest distortion can be selected to further search for a more accurate sub-pixel MV for the current block.

In further examples, the candidate MV list is expanded to include k more candidate MVs. These k additional candidate MVs can be the determined MVs for the previous k coded blocks of the current block. In some cases, k is 2. After adding the k more candidate MVs, the candidate MV list is examined to remove duplicate candidate MVs before being used to identify the candidate MV that leads to the smallest prediction distortion as described above.

By removing candidate MVs from the MVP list, the size of the MV candidate list can be reduced thereby reducing the computational complexity of the motion estimation process of the video coding. Further, MVs of previously coded blocks are likely to be similar to the MV of the current block. As such, adding MVs from previously coded blocks to the MV candidate list can provide a more accurate starting point for the MV search process. As a result, the MV candidate list constructed according to the disclosure presented herein can lead to faster and more accurate determination of the MV of the current block.

As discussed above, the MVP list contains the MVs of N neighboring blocks of the current block. To obtain the MVs of the neighboring blocks, the video encoder determines whether each neighboring block exists, and if so, retrieves the MV of the neighboring block to add to the MVP list. Determining the existence of a neighboring block for a current block is typically performed by checking the coordinates of the current block and the same process is repeated for each block. This process can consume a large amount of computation resources due to the large number of blocks in a video thereby causing delay in the encoding process. To speed up the process, the video encoder according to the disclosure presented herein can pre-calculate a set of neighboring availability masks based on the position of a super block in a picture or tile. At the time of determining the availability of a neighboring block (e.g., during mode decision or intra- or inter-prediction), the availability flag in a corresponding neighboring availability mask can be retrieved without further calculation thereby increasing the speed and reducing the computational complexity of the encoding.

For example, the set of neighboring availability masks can be generated to cover 9 different scenarios for the position of a super block: (1) at the left border of the picture or tile; (2) at the top border of the picture or tile; (3) at the right border of the picture or tile; (4) at the bottom border of the picture or tile; (5) at the top-left corner of the picture or tile; (6) at the top-right corner of the picture or tile; (7) at the bottom-right corner of the picture or tile; (8) at the bottom-left corner of the picture or tile; and (9) at the center of the picture or tile. For each of the 9 scenarios, the availabilities of up to five neighboring blocks of a super block are listed. The five neighboring blocks include the top-left neighboring block, the top neighboring block, the top-right neighboring block, the left neighboring block, and the bottom-left neighboring block. Further, subblocks of the super block under different partitioning schemes are also enumerated and indexed. The availabilities of the neighboring blocks of each subblock are determined based on the location of the super block within the picture or tile and the location of the subblock within the super block. At the time of determining the availability of a neighboring block, the video encoder can determine the index of a subblock (e.g., based on the location of the super block within the picture or tile and the location of the subblock within the super block), and the availability flags for the neighboring blocks can be retrieved directly from the corresponding neighboring availability mask according to the index.

This illustrative example is given to introduce the reader to the general subject matter discussed herein and the disclosure is not limited to this example. The following sections describe various additional non-limiting examples and examples of systems and methods for constructing a motion vector candidate list for inter-prediction in video coding.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
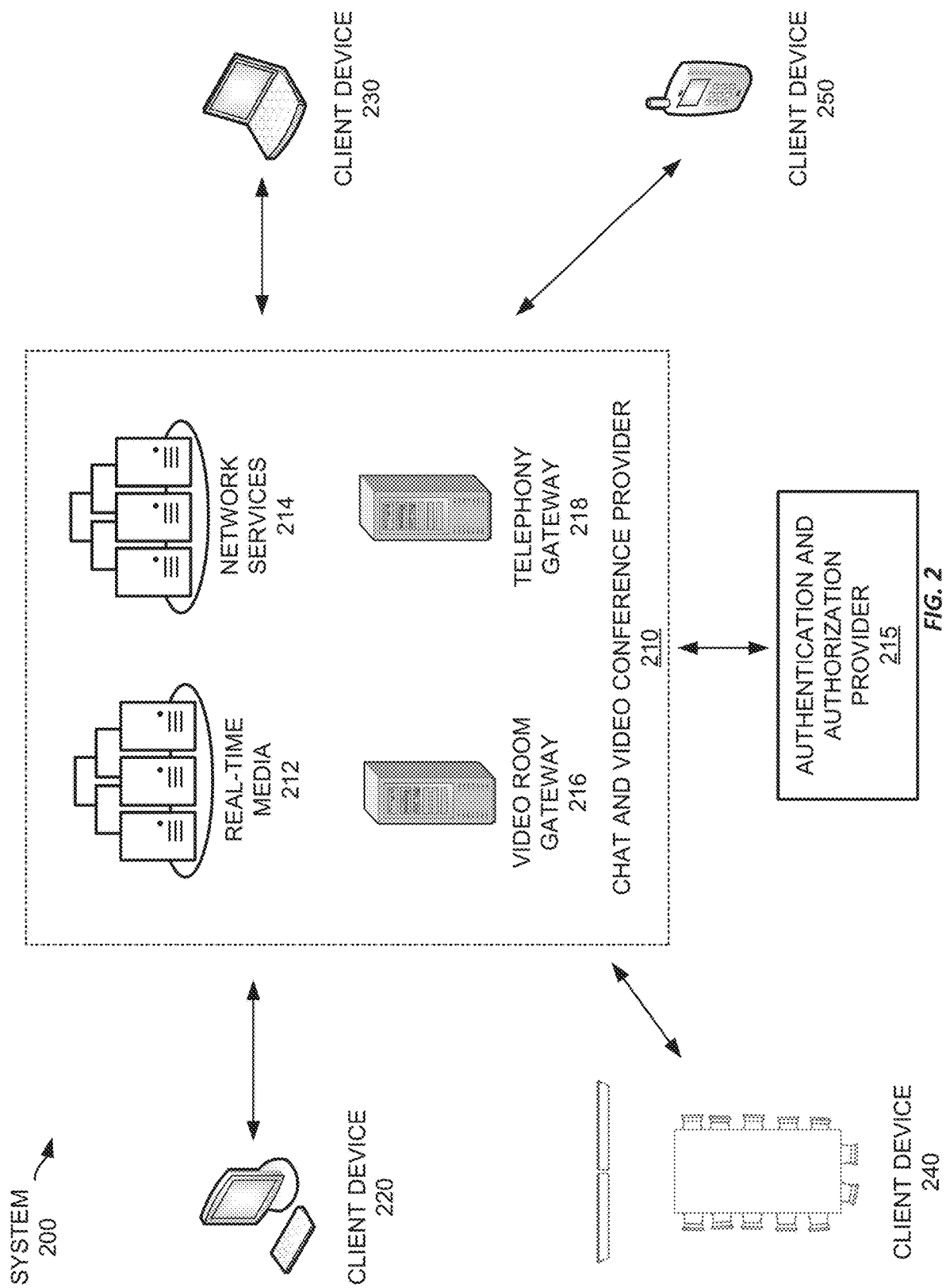
FIG. 2 shows another example of a system for providing videoconferencing and chat functionality to various client devices, according to some aspects of the present disclosure.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
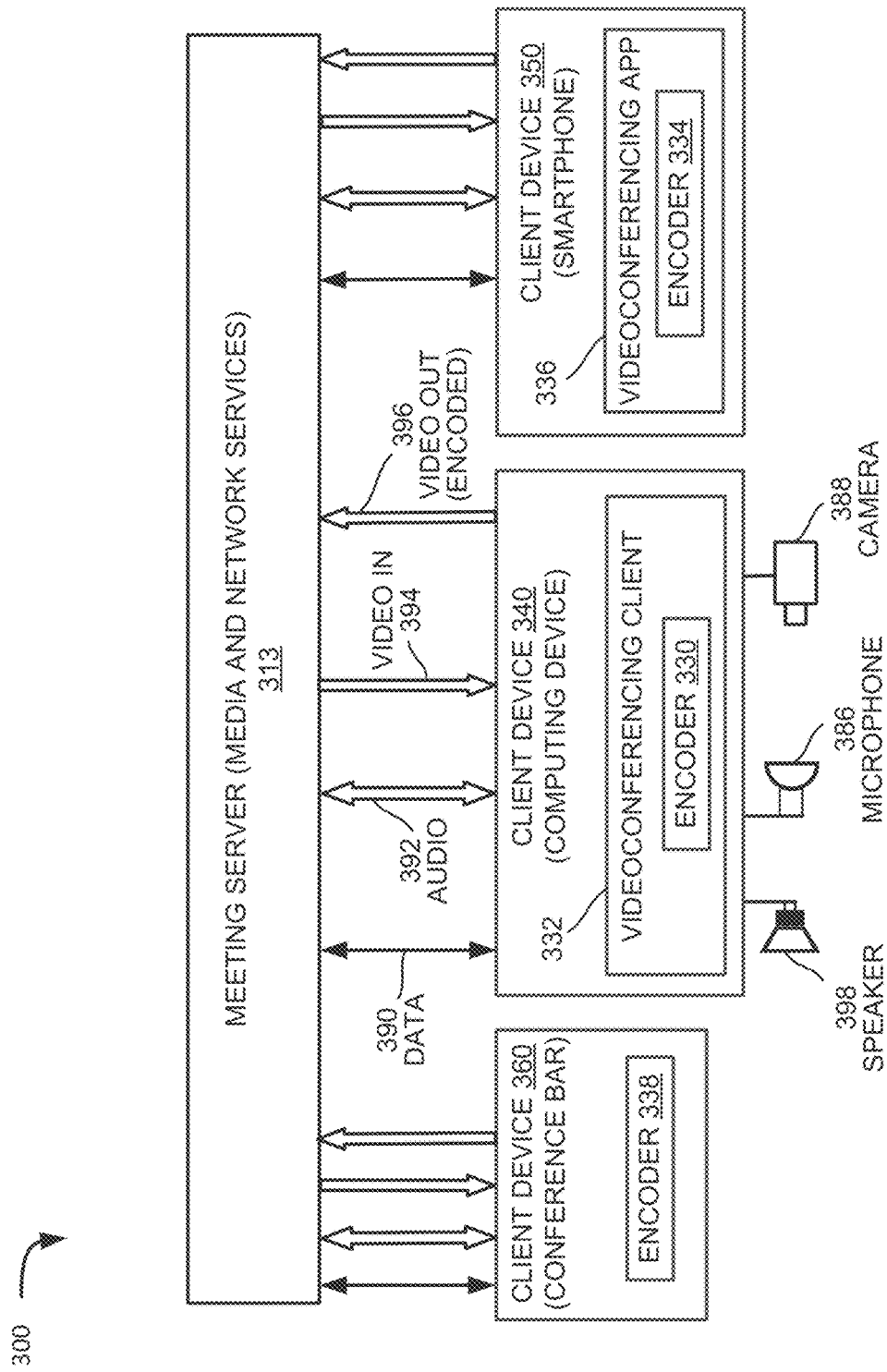
FIG. 3 shows an example of a system for providing videoconferencing functionality among various client devices, according to some aspects of the present disclosure.

Referring to FIG. 3, FIG. 3 shows example system 300. Example system 300 includes videoconferencing meeting server 313. Meeting server 313 may also be referred to as a multimedia router and can be implemented by the real-time media servers 212 working with the network services servers 214. The meeting server can keep track of the status of meetings without constantly exchanging this information with client devices.

System 300 includes an encoder module (encoder) 330 maintained on client device 340, which is coupled to meeting server 313 during a videoconferencing meeting. The encoder 330 is part of a videoconferencing client application 332 installed on client device 340, which in this example is a computing device such as a desktop or notebook computer. An encoder 334 is installed in client device 350, which in this example is a smartphone, but can be any suitable client device. Encoder 334 is part of a videoconferencing app 336. Encoder 338 is installed in client device 360, which in this example is conference bar, but can be any suitable client device. As an example, conference bar 360 may be used as the dedicated videoconferencing equipment in conference room 240. In some examples, a conference bar is a unitary device that can be wall or desk mounted. A conference bar can include a webcam, speaker, and microphone all in one and often has connections to add conference table speakers and/or microphones. Conference bar 360 in FIG. 3 includes microcode or firmware, which may implement encoder 338. Alternatively, an encoder chip may be provided in conference bar 360. For purposes of the discussion herein a codec, which is a combination of an encoder and a decoder, may be referred to as an encoder.

The various hardware configurations in use in a system such as system 300 may result in video input signals from various devices. These may include wired webcams connected to local computing devices via USB, cameras internal to notebook computers, tablet computers, smartphones, and conference bars or other kinds of dedicated conference room equipment. Video signals may also be generated internal to a computing device through screen sharing of documents, images, or incoming video feeds. An encoder that provides fast parameter search for chroma from luma intra prediction can be used with any of these sources.

In system 300, client devices maintain an active data connection 390 for any video or audio conference in which the host client device is participating. These data connections are illustrated with the single width, two-headed arrows in FIG. 3. The data connections are used for control, presence indication, chat, and other similar functions and can be maintained using TCP. Additionally, two-way audio streams carry audio between the meeting server 313 and the client devices. The two-way audio streams are shown with a double width, bidirectional arrow such as that shown for audio stream 392. Video received from the meeting server 313 at each client device shown is illustrated with a double-width, single-ended arrow such as that shown for video input from the network to client device 340, video stream 394. Video streams outgoing from the client devices, which are encoded by the encoder modules using fast parameter search for chroma from luma intra prediction, are illustrated by a similar double-width, single-ended arrow such as that shown for outgoing video stream 396. Audio and video streams, including the blocks and frames of outgoing video, can be transmitted over the network using UDP.

The encoders in system 300 can accept video signals originating from a camera connected to, built in to, or otherwise associated with the respective client device. For purposes of this example, client devices 350 and 360 have built-in microphones, speakers, and cameras, while client device 340 has an externally connected microphone 386, an externally connected camera 388, and an externally connected speaker 398. Alternatively, the microphone 386 may be separate from the speaker 398, for example, a desk or boom microphone, or a microphone that is part of the camera 388. A digital stream including encoded video frames is delivered to meeting server 313 after encoding.

Figure 4:
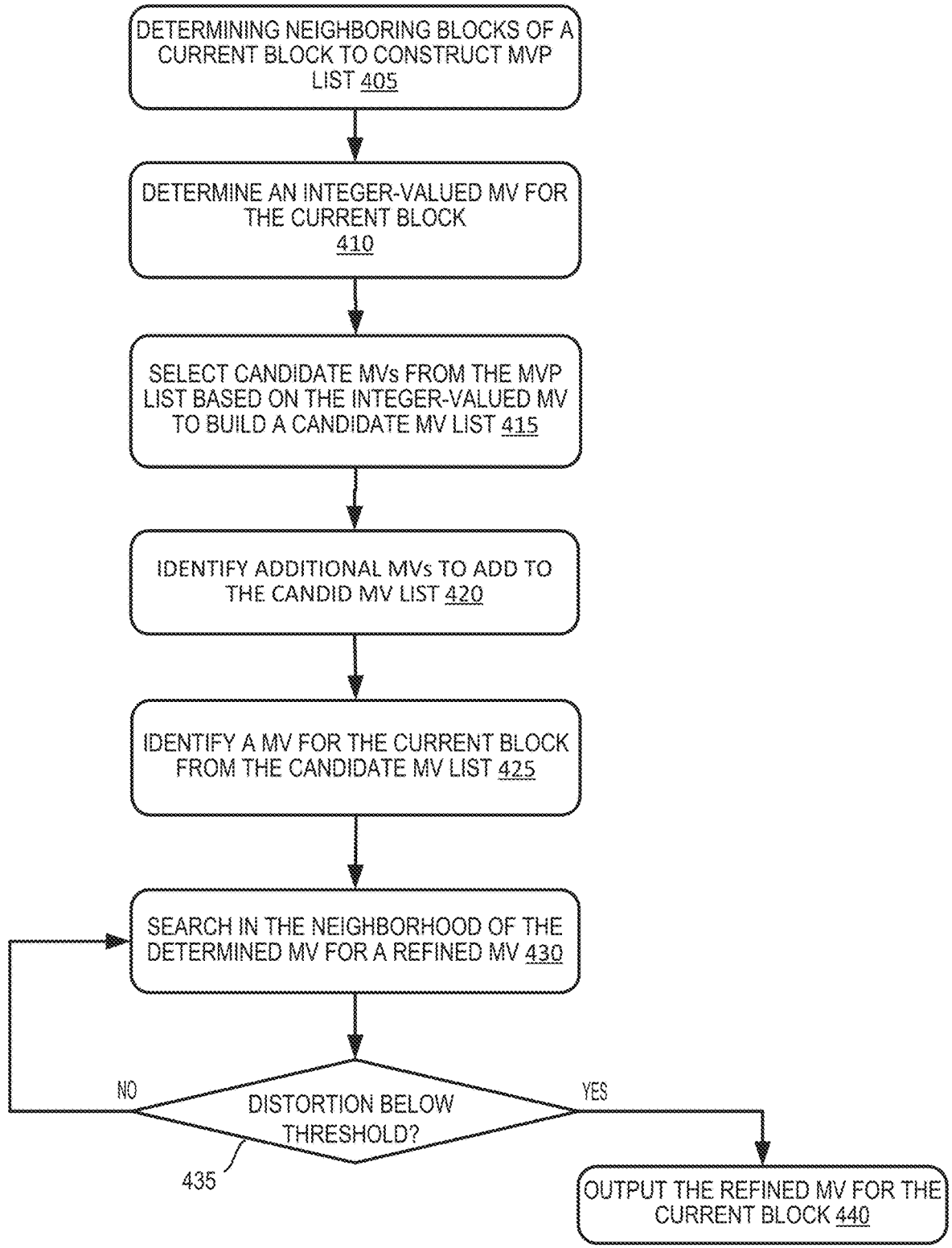
FIG. 4 shows an example process for constructing a motion vector candidate list and determining a motion vector therefrom for a video block for inter-prediction in video coding, according to some aspects of the present disclosure.

Referring now to FIG. 4, FIG. 4 shows an example process 400 for constructing a motion vector candidate list and determining a motion vector therefrom for a video block, according to certain aspects described herein. Other examples may involve more steps, fewer steps, different steps, or a different sequence of steps than is shown in FIG. 4. The steps of FIG. 4 can be performed by a processor of a client device, such as any of the client devices 140-170 of FIG. 1, the client devices 220-240 of FIG. 2, or the client devices 340-360 of FIG. 3. In some examples, the steps of FIG. 4 may be performed by a video encoder (e.g., video encoder 33, 334, or 338) executing on the processor.

At block 405, the process 400 involves determining neighboring blocks of a current block to construct a motion vector predictor (MVP) list. The MVP list includes the motion vectors (MVs) determined for the available neighboring blocks of the current block that have been coded. These neighboring blocks can include, if available, top neighboring blocks (one or more rows of blocks above the current block), left neighboring blocks (one or more columns of blocks to the left of the current block), top-left neighboring block, bottom-left neighboring block, and top-right neighboring block. Details regarding the determination of the availability of the neighboring blocks are provided below with regard to FIG. 5.

At block 410, the process 400 involves determining an integer-valued MV for the current block. To do so, the video encoder searches in the reference picture for a reference block at the integer pixel location that best match the current block. The offsets between the reference block and the current blocks are the integer-valued MV. Because the search is limited to integer pixel locations, the process of identifying the integer-valued MV is much faster than identifying MVs with sub-pixel coordinates.

At block 415, the process 400 involves selecting candidate MVs from the MVP list based on the integer-valued MV to build a candidate MV list. The video encoder can calculate a distance between each MV in the MVP list and the integer-valued MV to identify a subset of the MVs in the MVP list and includes the subset of MVs in the candidate MV list. For example, if the MVP contains N MVs, the encoder can identify n MVs having the smallest n distances from the integer-valued MV, where n<N. In some examples, N is 4 and n is 2. Given a value N, n can be selected to achieve a goal for the speed and performance. The distance can be an L1 distance or an L2 distance, such as $d=|MV1_x-MV2_x|+|MV1_y-MV2_y|$ or $d=\sqrt{(MV1_x-MV2_x)^2+(MV1_y-MV2_y)^2}$. Here, d is the distance; MV1 and MV2 are two MVs, such as the integer-valued MV and the MV in the MVP; $MVi_x$ and $MVi_y$ are the horizontal and vertical components of the motion vector MVi, respectively.

At block 420, the process 400 involves identifying additional MVs to be added to the candidate MV list. In some examples, the additional MVs are the determined MVs of the previously coded blocks. In some scenarios, the previously coded blocks may be closer to the current block and thus their MVs can serve as more accurate starting point for searching the MV of the current block. For instance, during the subblock partitioning process, the previous coded block may be a larger coding block containing the current block. In this case, the MV of this larger coding block may be more similar to the MV of the current block than its neighboring block. In some implementations, MVs of k previously coded blocks are added to the candidate MV list, for example, k=2. It is likely that the k previously coded blocks include a neighboring block of the current block and thus the MV of the previously coded block will be a duplicate of a MV in the candidate MV list. As such, after adding the k additional MVs, the candidate MV list can be examined to remove duplicate MVs. In further examples, if any of the k additional MVs is the same as a MV in the MVP list but not in the candidate MV list, such MV will be removed from the candidate MV list.

At block 425, the process 400 involves identifying a MV for the current block from the candidate MV list determined at block 420. For example, the video encoder can determine a reference block for each MV in the candidate MV list and calculate a distortion between the reference block and the current block. The MV that leads to the smallest distortion can be selected for the current block. The distortion can be measured as the mean squared error (MSE), the sum of squared errors (SSE), the sum of absolute transformed differences (SATD), the sum of absolute errors (SAE), and so on. In other examples, the distortion can also be measured as the bite rate cost associated with the MV. As such, the distortion used to determine the MV can the pixel-wise differences, the bit rate cost of the MVs, or any combinations thereof.

At block 430, the process 400 involves searching in the neighborhood of the identified MV to determine a refined MV for the current block. For instance, the video encoder can search at the sub-pixel level (e.g., ⅛, 1/16 sub-pixel) in the surrounding area of the reference block pointed by the identified MV for the current block. For each candidate refined MV, the distortion between the predicted block in the reference frame and the current block is calculated. The refined MV that leads to the smallest distortion is selected.

At block 435, the process 400 involves comparing the smallest distortion with a threshold of distortion. If the distortion is larger than the threshold, the process 400 continue to search for an updated refined MV near the neighborhood of the previously determined MV for the current block. If at block 435, it is determined that the distortion is below the threshold, the process 400 involves outputting the refined MV for the current block.

Compared with examining each MV in the MVP list, the technologies presented herein can remove the MVs that are far away from the actual MV of the current block, thereby saving the computation involved for those removed MVs. Further, by adding additional MVs that are closer to the actual MV of the current block, the search process can identify the MV with the distortion below the threshold earlier thereby reducing the number of iterations involved in the search process.

The identified MV can be encoded and included in the bitstream of the video. The reference block corresponds to the identified MV for the current block can be used to calculate the residuals for encoding into the bitstream of the video.

Depending on the location of the current block, not all neighboring blocks are available. For example, if the current block is at the top boundary of a picture or a tile, its top neighboring block, top-left neighboring block, and top-right neighboring block are not available. Likewise, if the current block is at the right boundary of a picture or a tile, its top-right neighboring block is not available. To determine if a neighboring block is available for video coding purposes, a set of neighboring block masks can be calculated. The availability of a neighboring block can be immediately determined by retrieving the flags stored in the neighboring block masks without further calculation thereby increasing the speed and reducing the computational complexity of the encoding.

Figure 5:
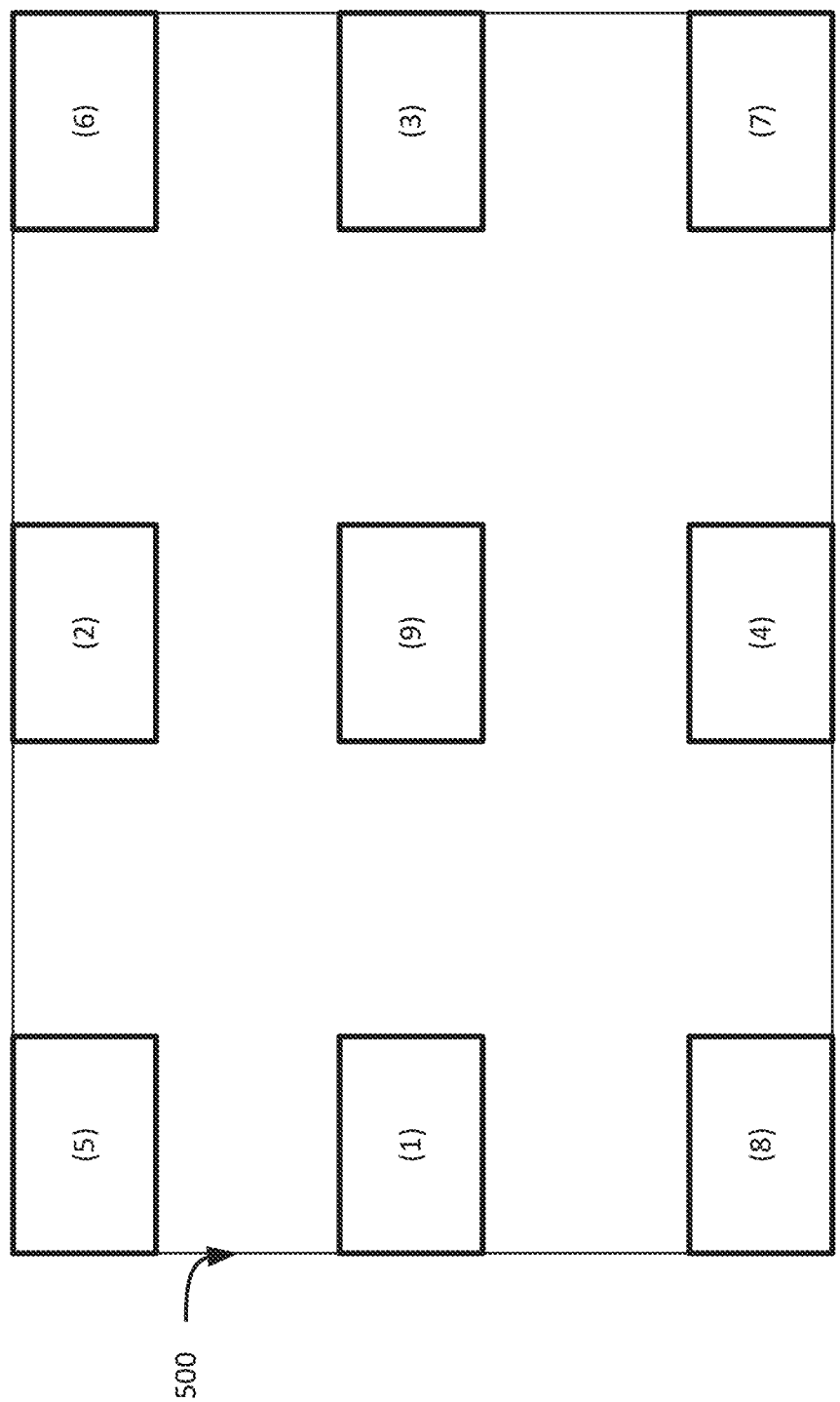
FIG. 5 shows an example of pixels near a block boundary involved in the in-loop filtering of a video frame according to some aspects of the present disclosure.

For example, the set of neighboring availability masks can be generated to cover 9 different scenarios for the position of a super block. FIG. 5 illustrates the 9 scenarios or categories: (1) the super block is at the left border of the picture or tile; (2) the super block is at the top border of the picture or tile; (3) the super block is at the right border of the picture or tile; (4) the super block is at the bottom border of the picture or tile; (5) the super block is at the top-left corner of the picture or tile; (6) the super block is at the top-right corner of the picture or tile; (7) the super block is at the bottom-right corner of the picture or tile; (8) the super block is at the bottom-left corner of the picture or tile; and (9) the super block is at the center of the picture or tile. A tile may be smaller than or equal to an encoding frame or picture. Each tile can be coded independently.

For each of the 9 scenarios, the availabilities of up to five neighboring blocks of a super block are listed. The five neighboring blocks include the top-left neighboring block, the top neighboring block, the top-right neighboring block, the left neighboring block, and the bottom-left neighboring block. Further, subblocks of the super block under different partitioning schemes are also enumerated and indexed. The availabilities of the neighboring blocks of each subblock are determined based on the location of the super block within the picture or tile and the location of the subblock within the super block. The availability of a neighboring block is indicated using an availability flag in the neighboring availability mask with, for example, 1 indicating available and 0 indicating unavailable. In some examples, all possible partitioning schemes of the superblock or subblock can be enumerated and the corresponding neighboring availability masks can be calculated. In other examples, the pre-calculated neighboring availability masks can be limited to the partitioning schemes that are supported by the video encoder.

The neighboring availability masks can be stored in the same hierarchy as the subblock partitioning schemes. For instance, the neighboring availability masks can be stored in a tree structure with a root note representing the superblock and storing the availability flags for the neighboring blocks of the superblock. Each branch of the tree structure represents a partitioning scheme, and the node of the corresponding branch stores the availability flags for neighboring blocks of each subblock of the partitioning scheme. Likewise, the branches can be extended from each node to represent further partitioning schemes of the subblock and to store availability flags for the neighboring blocks of the respective subblocks.

At the time of encoding, the encoder can determine the type of the superblock as one of the 9 scenarios listed above based on the location of the super block. The set of neighboring availability masks for the superblock can be determined accordingly. These neighboring availability masks can be navigated according to the partitioning scheme of the superblock. The video encoder can further determine the index of a subblock within the partition based on, for example, the location of the subblock within the super block. The availability flags for the neighboring blocks of the subblock can be retrieved directly from the corresponding neighboring availability mask according to the index.

While the above determination of availability of neighboring blocks is described in the context of determining MV for inter-prediction, the same determination technique can be used in any component of a video encoder where the availability of a neighboring block of a block needs to be determined. For example, the same pre-calculated sets of neighboring availability masks can be used during intra-prediction where availability of neighboring blocks of a block needs to be determined. In other words, the sets of neighboring availability masks for the 9 scenarios can be used for the encoding of an entire video and for any video.

Figure 6:
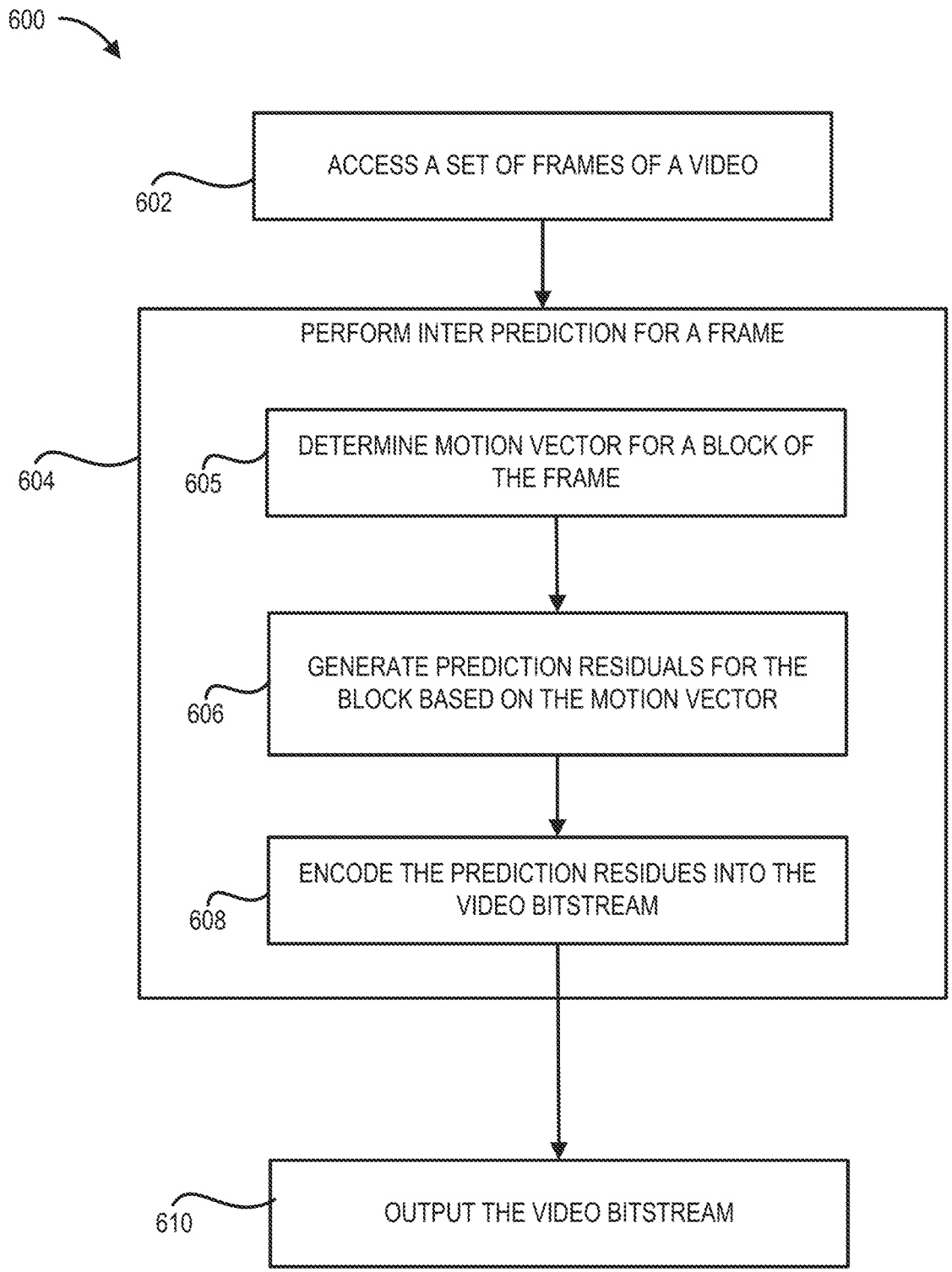
FIG. 6 shows a flowchart of an example of a process for encoding a video with motion vectors derived from motion vector candidate lists for inter-prediction according to some aspects of the present disclosure.

Referring now to FIG. 6, FIG. 6 shows a flowchart of an example of a process 600 for encoding a video with motion vectors derived from motion vector candidate lists for inter-prediction according to some aspects of the present disclosure. Other examples may involve more steps, fewer steps, different steps, or a different sequence of steps than is shown in FIG. 6. The steps of FIG. 6 can be performed by a processor of a client device, such as any of the client devices 140-170 of FIG. 1, the client devices 220-240 of FIG. 2 and the client devices 340-360 of FIG. 3. In some examples, the steps of FIG. 6 may be performed by a video encoder (e.g., video encoder 330, 334, 338) executing on the processor.

At block 602, the video encoder accesses a set of frames of a video, such as a group of pictures (GOP). The encoder can access the video frames from any suitable source, such as a camera coupled to the client device. In some examples involving a videoconference, the video frames may be captured by a webcam coupled to the client device, where client device can be operated by a participant in the videoconference. The video frame may depict the participant as well as other objects.

At block 604, which includes blocks 605-608, the process 600 involves performing inter prediction for a frame of the set of frames. Some frames (e.g., I-frames) in the set of frames have been encoded using intra predictions and the frame to be encoded using inter prediction can be a P-frame or a B-frame. At block 605, the encoder determines the motion vector for a block of the frame. The motion vector for the block can be determined using the process illustrated in FIG. 4 as described above. At block 606, the encoder generates prediction residuals for the block of the frame using the determined motion vector at block 605. As discussed above, the video encoder can generate a predicted block for the block of the frame using the motion vector from one or more reference frames. The differences between the predicted block and the block can be generated as the prediction residuals.

At block 608, the encoder encodes the prediction residuals of the block into a video bitstream for the video. The prediction residuals can be encoded into the video bitstream as discussed above. Blocks 605-608 may be repeated for other blocks of the frame. Block 604 may be repeated for other frames in the set of frames. At block 610, the encoded video bitstream can be output, for example, for transmitting over a network or for storage.

Figure 7:
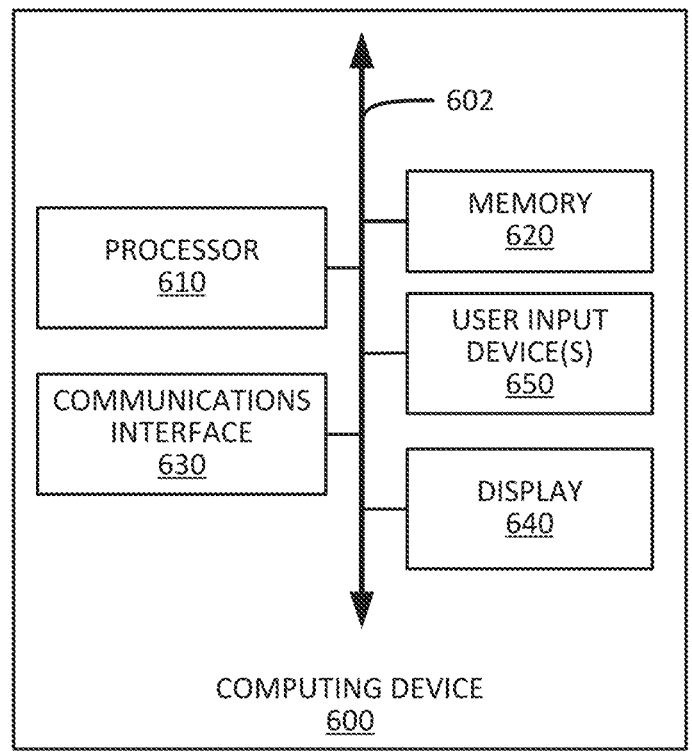
FIG. 7 shows a block diagram of an example of a computing device usable to implement some aspects of the present disclosure.

Referring now to FIG. 7, FIG. 7 shows an example computing device 700 suitable for use in example systems or methods for constructing a motion vector candidate list for inter-prediction in video coding as described herein. The example computing device 700 includes a processor 710 which is in communication with the memory 720 and other components of the computing device 700 using one or more communications buses 702. The processor 710 is configured to execute processor-executable instructions stored in the memory 720 to perform one or more methods for constructing a motion vector candidate list for inter-prediction. The computing device, in this example, also includes one or more user input devices 750, such as a keyboard, mouse, touchscreen, video input device (e.g., one or more cameras), microphone, etc., to accept user input, for example user input directed to activating or interacting with a videoconferencing application such as videoconferencing client device 340 or videoconferencing app 336. The computing device 700 also includes a display 740 to provide visual output to a user.

The computing device 700 also includes a communications interface 630. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in at least one memory device, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: a method for encoding a video, the method comprising: accessing a plurality of frames of the video; performing inter prediction for a frame in the plurality of frames to generate prediction residuals for the frame, wherein performing the inter prediction comprises: determining an integer-valued motion vector (MV) for a block of the frame based on a reference frame of the frame, selecting, based on the integer-valued MV, a subset of candidate MVs from a list of MVs comprising MVs of a plurality of neighboring blocks of the block, identifying a MV from the subset of candidate MVs for the block, searching in a neighborhood of the identified MV for a refined MV for the block, and calculating the prediction residuals for the block based on a reference block in the reference frame pointed by the refined MV; and encoding the prediction residuals for the frame into a bitstream representing the video.

Example #2: the method of Example #1, wherein selecting the subset of candidate MVs from the list of MVs comprises: calculating a distance of each MV in the list of MVs from the integer-valued MV; and selecting the subset of MVs from the list of MVs, each MV in the subset of MVs has a distance smaller than a distance associated with an unselected MVs.

Example #3: the method of Examples #1-2, wherein determining the integer-valued MV for a block comprises: searching in the reference frame for a reference block at an integer pixel location that has a smallest distortion from the block; and identifying an offset between the block and the reference block as the integer-valued MV.

Example #4: the method of Examples #1-3, wherein performing the inter prediction further comprises: prior to identifying a MV from the subset of candidate MVs for the block, adding one or more additional MVs to the subset of candidate MVs, the one or more additional MVs comprising a MV from a previous coded block of the block; and updating the subset of candidate MVs by removing duplicate MVs.

Example #5: the method of Examples #1-4, wherein identifying the MV from the subset of candidate MVs for the block comprises: determining a reference block in the reference frame for each MV in the subset of candidate MVs; calculating distortions between the block and the respective reference blocks; and selecting a MV from the subset of candidate MVs that corresponds to a smallest distortion among the distortions as the identified MV for the block.

Example #6: the method of Examples #1-5, wherein searching in the neighborhood of the identified MV for a refined MV for the block comprises: generating a group of refined MVs with sub-pixel coordinates in a neighborhood of the identified MV; determining a reference block in the reference frame for each refined MV in the group of refined MVs; calculating distortions between the block and the respective reference blocks; and selecting a refined MV from the group of refined MVs that corresponds to a smallest distortion among the distortions as the refined MV for the block.

Example #7: the method of Examples #1-6, wherein performing the inter prediction further comprises determining availabilities of neighboring blocks of the block, and wherein the plurality of neighboring blocks of the block are available neighboring blocks of the block.

Example #8: the method of Examples #1-7, wherein determining the availabilities of neighboring blocks of the block comprises: determining a category of a super block containing the block; retrieving a set of neighboring availability masks based on the determined category; retrieving neighboring availability flags associated the block from the set of neighboring availability masks; and determining the availabilities of the neighboring blocks based on the retrieved neighboring availability flags.

Example #9: the method of Examples #1-8, wherein the category is one of a first category where the super block is at a left border of the frame or a tile of the frame; a second category where the super block is at a top border of the frame or a tile of the frame; a third category where the super block is at a right border of the frame or a tile of the frame; a fourth category where the super block is at a bottom border of the frame or a tile of the frame; a fifth category where the super block is at a top-left corner of the frame or a tile of the frame; a sixth category where the super block is at a top-right corner of the frame or a tile of the frame; a seventh category where the super block is at a bottom-right corner of the frame or a tile of the frame; an eighth category where the super block is at a bottom-left corner of the frame or a tile of the frame; and a ninth category where the super block is at a center of the frame or a tile of the frame.

Example #10: the method of Examples #1-9, wherein the neighboring blocks comprise one or more of a top-left neighboring block, a top neighboring block, a top-right neighboring block, a left neighboring block, or a bottom-left neighboring block.

Example #11: the method of Examples #1-10, wherein retrieving neighboring availability flags associated the block from the set of neighboring availability masks is performed based on a partitioning scheme of a super block containing the block and a location of the block in the partitioning scheme.

Example #12: a system comprising: a processor; and at least one memory device including instructions that are executable by the processor to cause the processor to: access a plurality of frames of a video; perform inter prediction for a frame in the plurality of frames to generate prediction residuals for the frame, wherein performing the inter prediction comprises: determining an integer-valued motion vector (MV) for a block of the frame based on a reference frame of the frame, selecting, based on the integer-valued MV, a subset of candidate MVs from a list of MVs comprising MVs of a plurality of neighboring blocks of the block, identifying a MV from the subset of candidate MVs for the block, searching in a neighborhood of the identified MV for a refined MV for the block, and calculating the prediction residuals for the block based on a reference block in the reference frame pointed by the refined MV; and encode the prediction residuals for the frame into a bitstream representing the video.

Example #13: the system of Example #12, wherein selecting the subset of candidate MVs from the list of MVs comprises: calculating a distance of each MV in the list of MVs from the integer-valued MV; and selecting the subset of MVs from the list of MVs, each MV in the subset of MVs has a distance smaller than a distance associated with an unselected MVs.

Example #14: the system of Examples #12-13, wherein performing the inter prediction further comprises: prior to identifying a MV from the subset of candidate MVs for the block, adding one or more additional MVs to the subset of candidate MVs, the one or more additional MVs comprising a MV from a previous coded block of the block; and updating the subset of candidate MVs by removing duplicate MVs.

Example #15: the system of Examples #12-14, wherein performing the inter prediction further comprises determining availabilities of neighboring blocks of the block, and wherein the plurality of neighboring blocks of the block are available neighboring blocks of the block.

Example #16: the system of Examples #12-15, wherein determining the availabilities of neighboring blocks of the block comprises: determining a category of a super block containing the block; retrieving a set of neighboring availability masks based on the determined category; retrieving neighboring availability flags associated the block from the set of neighboring availability masks; and determining the availabilities of the neighboring blocks based on the retrieved neighboring availability flags.

Example #17: a non-transitory computer-readable medium comprising program code that is executable by one or more processors to cause the one or more processors to: access a plurality of frames of a video; perform inter prediction for a frame in the plurality of frames to generate prediction residuals for the frame, wherein performing the inter prediction comprises: determining an integer-valued motion vector (MV) for a block of the frame based on a reference frame of the frame, selecting, based on the integer-valued MV, a subset of candidate MVs from a list of MVs comprising MVs of a plurality of neighboring blocks of the block, identifying a MV from the subset of candidate MVs for the block, searching in a neighborhood of the identified MV for a refined MV for the block, and calculating the prediction residuals for the block based on a reference block in the reference frame pointed by the refined MV; and encode the prediction residuals for the frame into a bitstream representing the video.

Example #18: the non-transitory computer-readable medium of Example #17, wherein performing the inter prediction further comprises: prior to identifying a MV from the subset of candidate MVs for the block, adding one or more additional MVs to the subset of candidate MVs, the one or more additional MVs comprising a MV from a previous coded block of the block; and updating the subset of candidate MVs by removing duplicate MVs.

Example #19: the non-transitory computer-readable medium of Examples #17-18, wherein performing the inter prediction further comprises determining availabilities of neighboring blocks of the block, and wherein the plurality of neighboring blocks of the block are available neighboring blocks of the block and wherein determining the availabilities of neighboring blocks of the block comprises: determining a category of a super block containing the block; retrieving a set of neighboring availability masks based on the determined category; retrieving neighboring availability flags associated the block from the set of neighboring availability masks; and determining the availabilities of the neighboring blocks based on the retrieved neighboring availability flags.

Example #20: the non-transitory computer-readable medium of Examples #17-19, wherein the category is one of a first category where the super block is at a left border of the frame or a tile of the frame; a second category where the super block is at a top border of the frame or a tile of the frame; a third category where the super block is at a right border of the frame or a tile of the frame; a fourth category where the super block is at a bottom border of the frame or a tile of the frame; a fifth category where the super block is at a top-left corner of the frame or a tile of the frame; a sixth category where the super block is at a top-right corner of the frame or a tile of the frame; a seventh category where the super block is at a bottom-right corner of the frame or a tile of the frame; an eighth category where the super block is at a bottom-left corner of the frame or a tile of the frame; and a ninth category where the super block is at a center of the frame or a tile of the frame.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method for encoding a video, the method comprising:
accessing a plurality of frames of the video;
performing inter prediction for a frame in the plurality of frames to generate prediction residuals for the frame, wherein performing the inter prediction comprises:
determining an integer-valued motion vector (MV) for a block of the frame based on a reference frame of the frame,
selecting, based on the integer-valued MV, a subset of candidate MVs from a list of MVs comprising MVs of a plurality of neighboring blocks of the block,
identifying a MV from the subset of candidate MVs for the block,
searching in a neighborhood of the identified MV for a refined MV for the block, and
calculating the prediction residuals for the block based on a reference block in the reference frame pointed by the refined MV; and
encoding the prediction residuals for the frame into a bitstream representing the video.

2. The method of claim 1, wherein selecting the subset of candidate MVs from the list of MVs comprises:
calculating a distance of each MV in the list of MVs from the integer-valued MV; and
selecting the subset of MVs from the list of MVs, each MV in the subset of MVs has a distance smaller than a distance associated with an unselected MVs.

3. The method of claim 1, wherein determining the integer-valued MV for a block comprises:
searching in the reference frame for a reference block at an integer pixel location that has a smallest distortion from the block; and
identifying an offset between the block and the reference block as the integer-valued MV.

4. The method of claim 1, wherein performing the inter prediction further comprises:
prior to identifying a MV from the subset of candidate MVs for the block,
adding one or more additional MVs to the subset of candidate MVs, the one or more additional MVs comprising a MV from a previous coded block of the block; and
updating the subset of candidate MVs by removing duplicate MVs.

5. The method of claim 1, wherein identifying the MV from the subset of candidate MVs for the block comprises:
determining a reference block in the reference frame for each MV in the subset of candidate MVs;
calculating distortions between the block and the respective reference blocks; and
selecting a MV from the subset of candidate MVs that corresponds to a smallest distortion among the distortions as the identified MV for the block.

6. The method of claim 1, wherein searching in the neighborhood of the identified MV for a refined MV for the block comprises:
generating a group of refined MVs with sub-pixel coordinates in a neighborhood of the identified MV;
determining a reference block in the reference frame for each refined MV in the group of refined MVs;
calculating distortions between the block and the respective reference blocks; and
selecting a refined MV from the group of refined MVs that corresponds to a smallest distortion among the distortions as the refined MV for the block.

7. The method of claim 1, wherein performing the inter prediction further comprises determining availabilities of neighboring blocks of the block, and wherein the plurality of neighboring blocks of the block are available neighboring blocks of the block.

8. The method of claim 7, wherein determining the availabilities of neighboring blocks of the block comprises:
   determining a category of a super block containing the block;
   retrieving a set of neighboring availability masks based on the determined category;
   retrieving neighboring availability flags associated the block from the set of neighboring availability masks; and
   determining the availabilities of the neighboring blocks based on the retrieved neighboring availability flags.

9. The method of claim 8, wherein the category is one of a first category where the super block is at a left border of the frame or a tile of the frame; a second category where the super block is at a top border of the frame or a tile of the frame; a third category where the super block is at a right border of the frame or a tile of the frame; a fourth category where the super block is at a bottom border of the frame or a tile of the frame; a fifth category where the super block is at a top-left corner of the frame or a tile of the frame; a sixth category where the super block is at a top-right corner of the frame or a tile of the frame; a seventh category where the super block is at a bottom-right corner of the frame or a tile of the frame; an eighth category where the super block is at a bottom-left corner of the frame or a tile of the frame; and a ninth category where the super block is at a center of the frame or a tile of the frame.

10. The method of claim 8, wherein the neighboring blocks comprise one or more of a top-left neighboring block, a top neighboring block, a top-right neighboring block, a left neighboring block, or a bottom-left neighboring block.

11. The method of claim 8, wherein retrieving neighboring availability flags associated the block from the set of neighboring availability masks is performed based on a partitioning scheme of a super block containing the block and a location of the block in the partitioning scheme.

12. A system comprising:
   a processor; and
   at least one memory device including instructions that are executable by the processor to cause the processor to:
      access a plurality of frames of a video;
      perform inter prediction for a frame in the plurality of frames to generate prediction residuals for the frame, wherein performing the inter prediction comprises:
         determining an integer-valued motion vector (MV) for a block of the frame based on a reference frame of the frame,
         selecting, based on the integer-valued MV, a subset of candidate MVs from a list of MVs comprising MVs of a plurality of neighboring blocks of the block,
         identifying a MV from the subset of candidate MVs for the block,
         searching in a neighborhood of the identified MV for a refined MV for the block, and
         calculating the prediction residuals for the block based on a reference block in the reference frame pointed by the refined MV; and
      encode the prediction residuals for the frame into a bitstream representing the video.

13. The system of claim 12, wherein selecting the subset of candidate MVs from the list of MVs comprises:
   calculating a distance of each MV in the list of MVs from the integer-valued MV; and
   selecting the subset of MVs from the list of MVs, each MV in the subset of MVs has a distance smaller than a distance associated with an unselected MVs.

14. The system of claim 12, wherein performing the inter prediction further comprises:
   prior to identifying a MV from the subset of candidate MVs for the block,
   adding one or more additional MVs to the subset of candidate MVs, the one or more additional MVs comprising a MV from a previous coded block of the block; and
   updating the subset of candidate MVs by removing duplicate MVs.

15. The system of claim 12, wherein performing the inter prediction further comprises determining availabilities of neighboring blocks of the block, and wherein the plurality of neighboring blocks of the block are available neighboring blocks of the block.

16. The system of claim 15, wherein determining the availabilities of neighboring blocks of the block comprises:
   determining a category of a super block containing the block;
   retrieving a set of neighboring availability masks based on the determined category;
   retrieving neighboring availability flags associated the block from the set of neighboring availability masks; and
   determining the availabilities of the neighboring blocks based on the retrieved neighboring availability flags.

17. A non-transitory computer-readable medium comprising program code that is executable by one or more processors to cause the one or more processors to:
   access a plurality of frames of a video;
   perform inter prediction for a frame in the plurality of frames to generate prediction residuals for the frame, wherein performing the inter prediction comprises:
      determining an integer-valued motion vector (MV) for a block of the frame based on a reference frame of the frame,
      selecting, based on the integer-valued MV, a subset of candidate MVs from a list of MVs comprising MVs of a plurality of neighboring blocks of the block,
      identifying a MV from the subset of candidate MVs for the block,
      searching in a neighborhood of the identified MV for a refined MV for the block, and
      calculating the prediction residuals for the block based on a reference block in the reference frame pointed by the refined MV; and
   encode the prediction residuals for the frame into a bitstream representing the video.

18. The non-transitory computer-readable medium of claim 17, wherein performing the inter prediction further comprises:
   prior to identifying a MV from the subset of candidate MVs for the block,
   adding one or more additional MVs to the subset of candidate MVs, the one or more additional MVs comprising a MV from a previous coded block of the block; and
   updating the subset of candidate MVs by removing duplicate MVs.

19. The non-transitory computer-readable medium of claim 17, wherein performing the inter prediction further comprises determining availabilities of neighboring blocks of the block, and wherein the plurality of neighboring blocks of the block are available neighboring blocks of the block and wherein determining the availabilities of neighboring blocks of the block comprises:

determining a category of a super block containing the block;

retrieving a set of neighboring availability masks based on the determined category;

retrieving neighboring availability flags associated the block from the set of neighboring availability masks; and determining the availabilities of the neighboring blocks based on the retrieved neighboring availability flags.

20. The non-transitory computer-readable medium of claim 19, wherein the category is one of a first category where the super block is at a left border of the frame or a tile of the frame; a second category where the super block is at a top border of the frame or a tile of the frame; a third category where the super block is at a right border of the frame or a tile of the frame; a fourth category where the super block is at a bottom border of the frame or a tile of the frame; a fifth category where the super block is at a top-left corner of the frame or a tile of the frame; a sixth category where the super block is at a top-right corner of the frame or a tile of the frame; a seventh category where the super block is at a bottom-right corner of the frame or a tile of the frame; an eighth category where the super block is at a bottom-left corner of the frame or a tile of the frame; and a ninth category where the super block is at a center of the frame or a tile of the frame.

* * * * *